United States Patent [19]

Hager et al.

[11] Patent Number: 4,701,023

[45] Date of Patent: Oct. 20, 1987

[54] OPTICAL ARRANGEMENT FOR TRANSMITTING HIGH-INTENSITY RADIATION

[75] Inventors: Karl-Heinz Hager, Heidenheim-Schnaitheim; Peter Henneberg, Aalen; Hans-Joachim Juranek, Aalen-Waldhausen, all of Fed. Rep. of Germany

[73] Assignee: Carl-Zeiss-Stiftung, Heidenheim, Fed. Rep. of Germany

[21] Appl. No.: 786,660

[22] Filed: Oct. 11, 1985

[30] Foreign Application Priority Data

Oct. 11, 1984 [DE] Fed. Rep. of Germany ....... 3437271

[51] Int. Cl.⁴ .......................... G02B 7/00; G02B 27/00; F21Q 7/00
[52] U.S. Cl. .................................... 350/321; 350/167; 350/174; 362/245; 362/294
[58] Field of Search ............... 350/321, 167, 574, 573, 350/432, 503, 174; 362/245, 328, 294

[56] References Cited

U.S. PATENT DOCUMENTS 4,306,810 12/1981 Maddox .............................. 356/369
4,370,021 1/1983 Khoe et al. ........................ 350/96.18
4,550,979 11/1985 Meier ................................. 350/321

*Primary Examiner*—Jon W. Henry
*Attorney, Agent, or Firm*—Walter Ottesen

[57] ABSTRACT

In sun simulators of the off-axis type, the angle at which the collimator mirror reflects the incident beam onto the test object causes a distortion error dependent on the radius of curvature of the collimator mirror. This error distorts the cross-section of the beam in the test plane. An optical arrangement is disclosed and includes an integrator assembly having a field lens array made up of a plurality of field lenses arranged one next to the other. The distortion is compensated for by providing that the periphery of each lens is elliptical with the axes ratio of the ellipse chosen in accordance with the magnitude of the previously computed error of distortion.

5 Claims, 6 Drawing Figures

OPTICAL ARRANGEMENT FOR TRANSMITTING HIGH-INTENSITY RADIATION

FIELD OF THE INVENTIION

The invention relates to an optical system for transmitting high-intensity radiation into a test plane having predetermined dimensions. The test plane can be, for example, located in the test chamber of a sun simulator.

BACKGROUND OF THE INVENTION

Optical systems of this type are used, for example, for so-called sun simulators, that is, test equipment in which space missiles are subjected to artificially created space conditions, including an intense, single-sided radiant flux corresponding to solar radiation.

To generate the necessary high-radiation intensity, a plurality of high-power lamps are placed in a row and supply a light flux corresponding to a power of several 100 kw. This light flux is directed onto the test object via an integrator assembly made up of an array of field lenses arranged side-by-side and an identical arrangement of projection lenses as well as via a collimator mirror mounted in the interior of the evacuated test chamber. In this arrangement, the collimator mirror is usually positioned to reflect the beam off-axis which beam arrives from the integrator, that is, the beam is reflected at an angle to its axis of symmetry.

As a result of this arrangement, the collimator mirror transforms the circular-conical beam of the state-of-the-art emanating from the integrator into a beam of elliptical cross section. The light outside the given usable region of the test plane is lost and has to be removed by costly cooling equipment. On the other hand, this part of the radiation is missing in the test plane.

SUMMARY OF THE INVENTION

It is the object of the invention to configure the optical system of the type referred to above so as to prevent as far as possible the occurrence of radiation outside the given usable region of the test plane.

According to a feature of the invention, the shape of the outer edge of the individual field lenses is selected to deviate from the circular shape such that, considering the distortion introduced by the collimator mirror, the cross-sectional shape of the beam reflected by the collimator mirror corresponds to the predetermined dimensions of the test plane.

According to the invention, the shape of the beam impinging on the test plane is thus adapted solely by suitably selecting the shape of the outer edges of the integrator field lenses. Influencing the shape of the radiation cone impinging on the test plane is made possible at this point because the field lenses are arranged in a plane conjugated to the test plane, that is, their mounts correspond to a diaphragm which is imaged into the test plane on an enlarged scale.

The precise shape of the edge is obtained by means of a simple computation from the radius of curvature of the collimator mirror, its distance from the test plane and the integrator, and the angle between its axis and the axis of the incident beam. For example, an elliptical shape will be chosen for the edges of the field lenses if a circle is the predetermined shape of the test plane. In this embodiment, the longer axes of the ellipses lie in the plane defined by the axes of the beam incident on, and reflected by, the collimator mirror.

Even if another shape is given for the test plane, for example, a square, the cross section of the beam reflected by the collimator mirror can be adapted thereto. In this embodiment, the edges of the field lenses have a pillow-like or pincushion shape.

The projection lenses, which are arranged downstream of the field lenses in systems of the kind referred to above, have edges adapted to those of the field lenses to hold light loss to a minimum in the integrator made up of the field lenses and the projection lenses.

The advantage achieved with the invention is primarily that radiation occurs in the test plane only where it is actually required. Thus, the invention makes it unnecessary to provide costly cooling equipment in the test chamber itself to eliminate portions of radiation which are not required. Accordingly, the efficiency of a sun simulator configured according to the invention is significantly better when compared to known sun simulators. Efficiency is understood to mean the quotient of supplied electric lamp power and usable light power in the test plane.

Another advantage of the arrangement of the invention is its simple configuration because it obviates the need for additional optical surfaces where additional loss of light would occur. Also, the collimator mirror, which represents a critical and costly component in view of its size and position in the evacuated interior of the test chamber, need not be modified.

BRIEF DESCRIPTION OF THE DRAWING

The invention will now be described with reference to the drawing wherein.

DESCRIPTION OF THE PREFERRED EMBODIMENTS OF THE INVENTION

Figure 1:
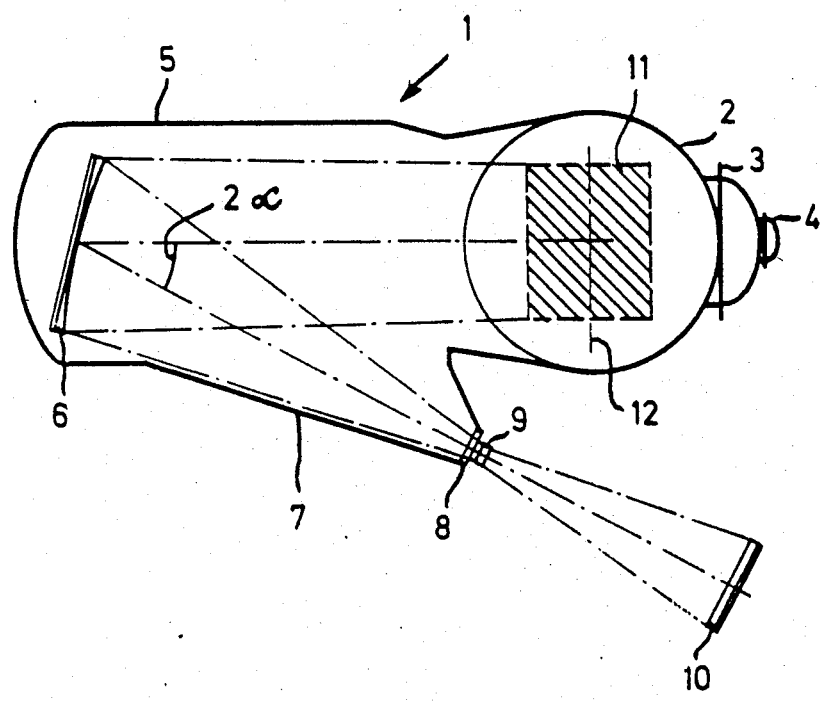
FIG. 1 is a schematic of a sun simulator of the off-axis type.

The sun simulator of FIG. 1 includes a housing essentially constructed of two adjoining cylindrical tanks 2 and 5. The vertical tank 2 has two entrance openings 3 and 4 providing access to the test chamber. The openings 3 and 4 are closable to provide a vacuum-tight seal. Tank 2 contains the test volume 11 shown by the hatched region into which the object to be tested is placed. The test volume 11 has the shape of a horizontal cylinder extending symmetrically on either side of the circular test plane 12.

The horizontal tank 5 has a lateral conical connecting piece 7. The end face of connecting piece 7 carries a vacuum-tight radiation window 8. The interior of the tank 5 further accommodates a collimator mirror 6 which reflects the radiation passing through the window 8 onto the test plane 12 at an angle of $2\alpha$.

To generate the intensive radiation flux necessary for simulating the solar radiation, a plurality of individual xenon high-pressure lamps clustered in a lamp array 10 are arranged outside the vacuum tank 2, 5. The radiation of these lamps is focussed by an integrator assembly 9 made up of field lenses and projection lenses in the immediate proximity of the radiation window 8.

Figure 2:
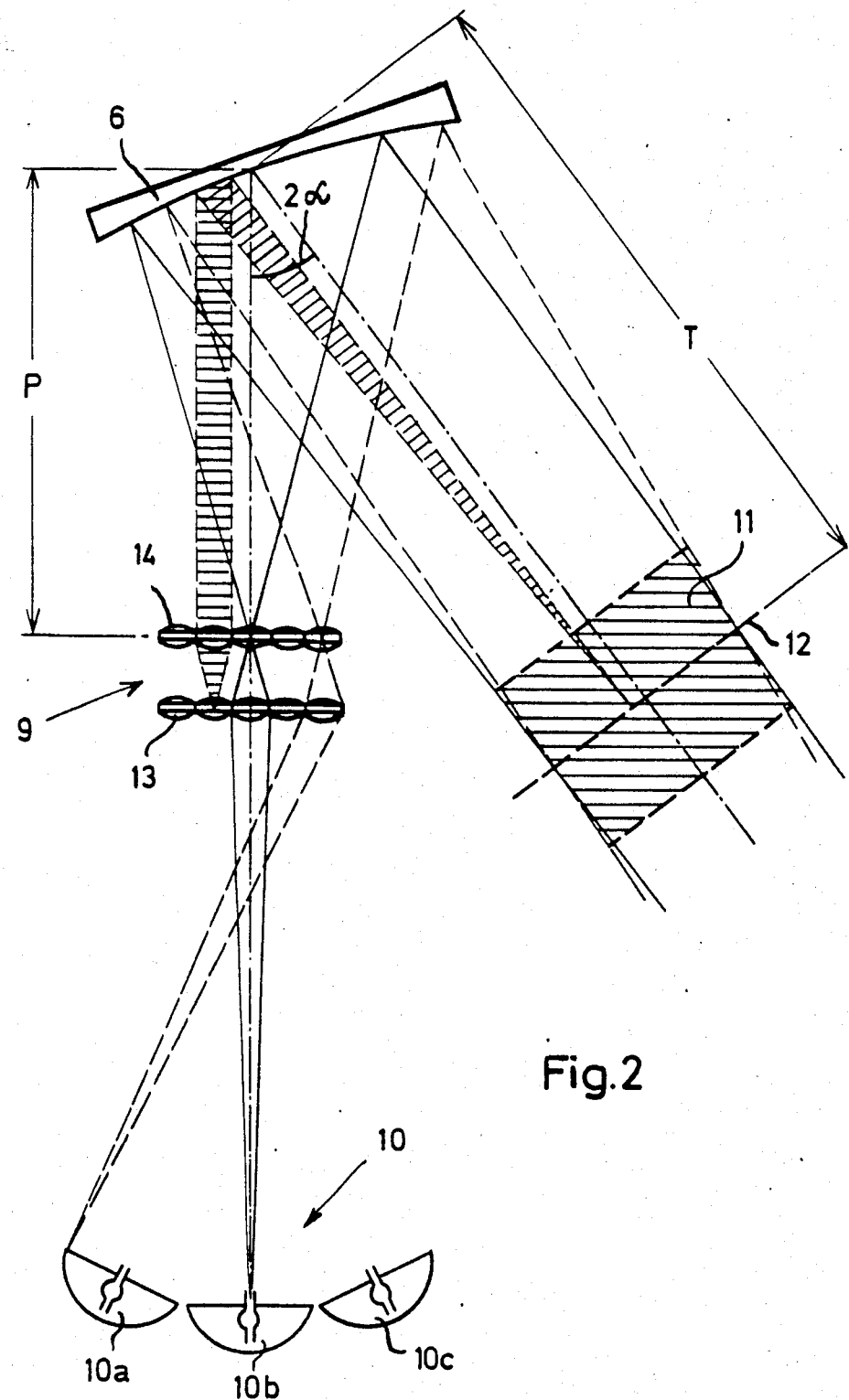
FIG. 2 is a schematic of the beam path in the optical arrangement of the sun simulator of FIG. 1 and shows the optical arrangement in principal section.

FIG. 2 is a more detailed principal section view of the optical system by means of which the light from the xenon high-pressure lamps is transmitted into the test plane 12 or the test volume 11. FIG. 2 shows that the integrator assembly 9 between the lamp array 10 and the collimator mirror 6 is made up of two separate lens arrays mounted one behind the other, that is, one field lens array 13 and one projection lens array 14. Each array 13 and 14 includes a plurality of individual lenses arranged both horizontally and vertically. Each lens of the field lens array 13 images the complete lamp array 10 into a corresponding lens of the projection lens array 14; whereas each projection lens of the array 14 images a field lens corresponding thereto into the test plane 12 via the collimator mirror 6.

Figure 3:
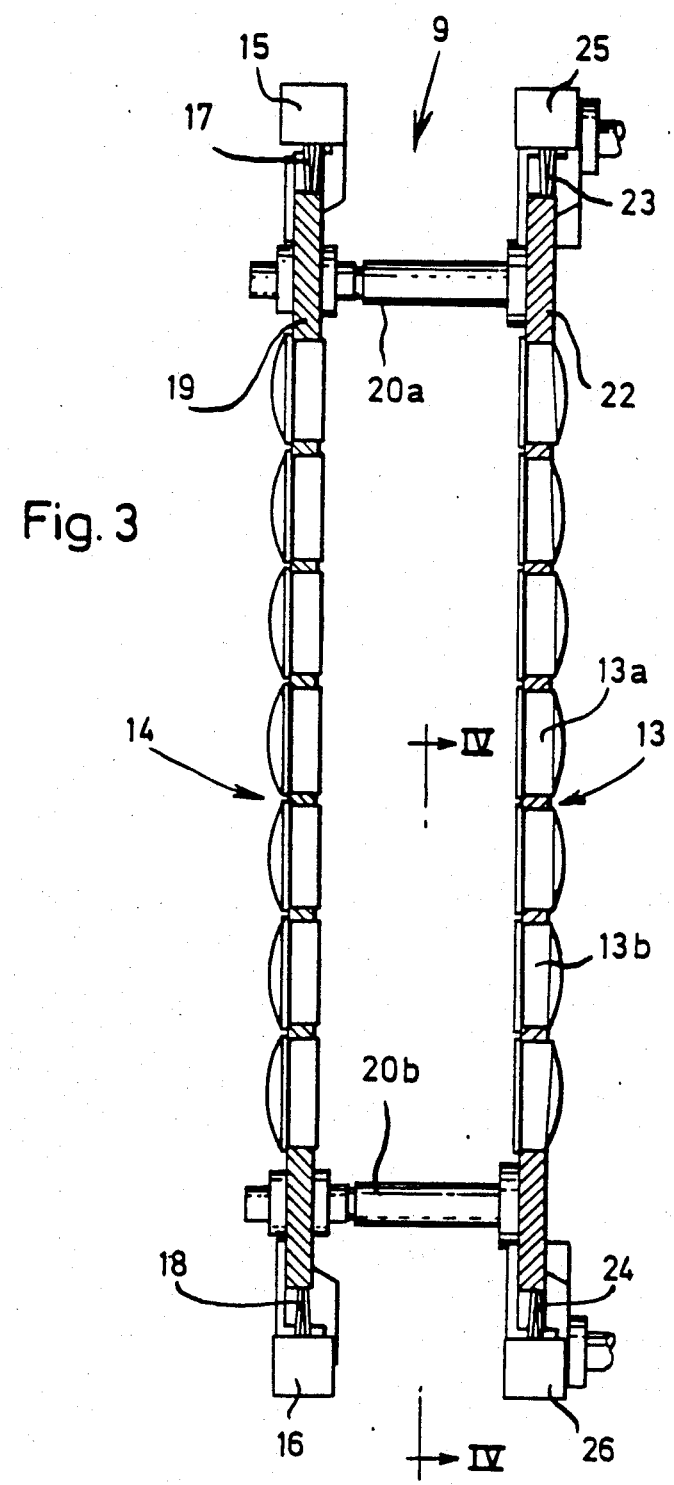
FIG. 3 is a detail view of the integrator assembly of the optical arrangement of FIG. 2 on an enlarged scale adapted to provide a test plane in the form of a circle as shown in FIG. 5.
Figure 4:
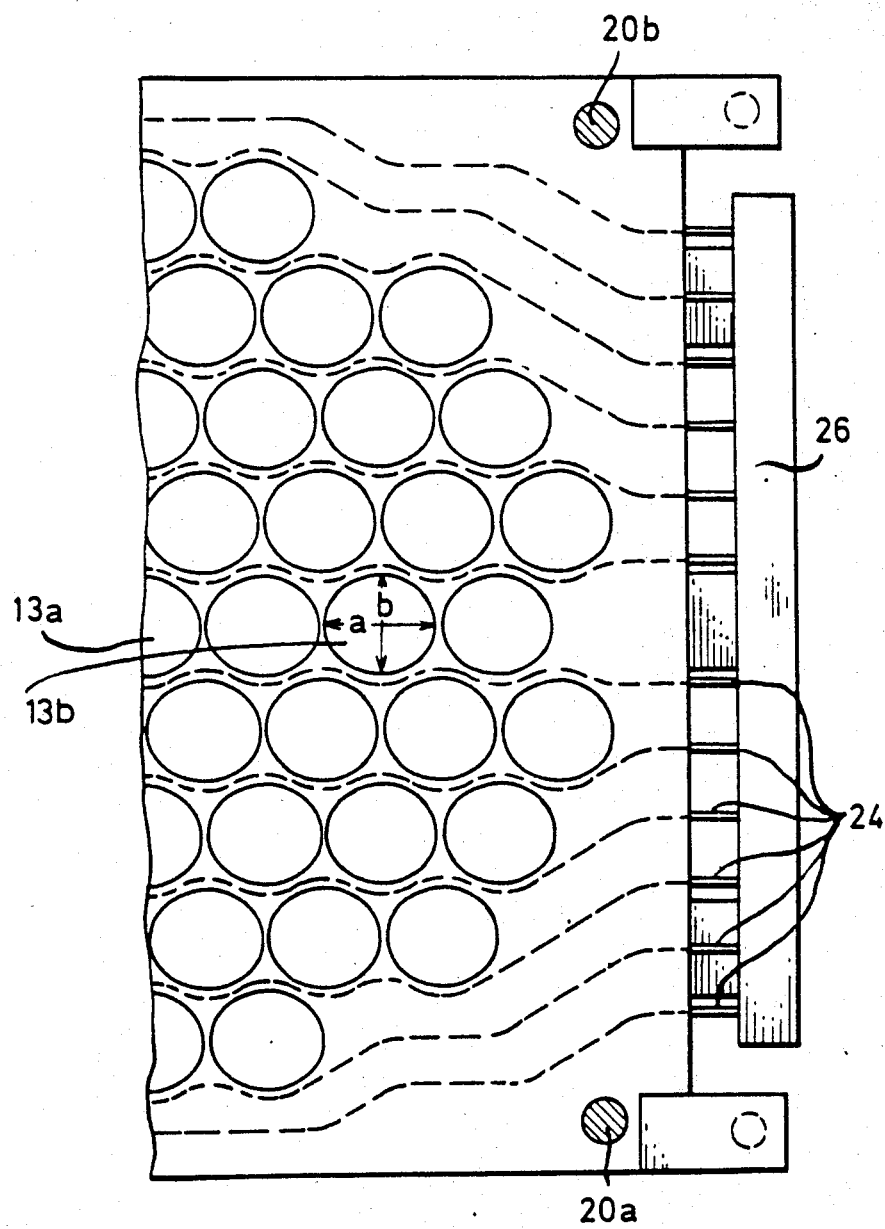
FIG. 4 is a view of one half of the field lens arrangement of the integrator assembly of FIG. 3.
Figure 5:
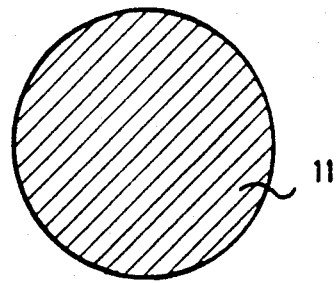
FIG. 5 is a plan view of the test plane obtained with the integrator shown in FIG. 3; and, FIG. 6 is a pincushion-shaped lens for use in the integrator assembly of FIG. 3 when a test plane in the form shown in FIG. 2 is desired.

The integrator assembly 9 is shown in greater detail in FIGS. 3 and 4 for the situation wherein the test plane is to have the shape of a circle as shown in FIG. 5. The integrator assembly 9 includes a cluster of twenty-five field lenses 13 and twenty-five integrator lenses 14 closely packed and seated in respective rectangular plates 22 and 19 each of which is configured as a lens holder. The two plates 19 and 22 are held in spaced relationship to each other by four bolts of which bolts 20a and 20b are shown. Cooling ducts are arranged between the lenses and extend through the plates 19 and 22. The cooling ducts of plate 19 are supplied via connecting conduits 17, 18 with coolant from distributor boxes 15 and 16 disposed at respective ends of the plate 19. Likewise, the cooling ducts of plate 20 are supplied via connecting conduits 23, 24 with coolant from distributor boxes 25 and 26 disposed at respective ends of plate 20. These cooling ducts conduct the heat away which is generated in the lenses of arrays 13 and 14 and their holders by the absorption of light. FIG. 3 shows that the field lenses of array 13 are prismatic towards the edge of the array 13 in dependence on their respective positions relative to the centrally positioned lens 13a.

Figure 6:
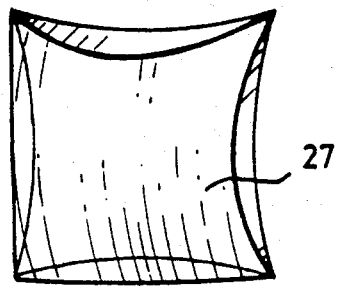

If the test plane is a square as shown in FIG. 2 at reference numeral 11, then the integrator assembly of FIG. 3 is fitted with a plurality of pincushion-shaped lenses of which one is shown in FIG. 6.

As mentioned in the foregoing, the beam emanating from the integrator assembly 9 impinges on the axis of the collimator mirror 6 at an angle α where its cross-sectional form becomes distorted. This distortion is dependent on the angle of incidence α on the mirror, the radius of curvature r of the mirror, the distance P of the mirror from the integrator (projection distance), and the distance T of the mirror from the test plane (target distance). Since in known arrangements the cross sections of the field lenses of array 13 are circular, this distortion error causes the cross section of the beam to be elliptically distorted in the test plane 12, with the axes ratio V of the ellipse being:

$$V = \frac{a'}{b'} = \frac{1 - T\left(\frac{2\cos\alpha}{r} - \frac{1}{P}\right)}{1 - T\left(\frac{2}{r\cos\alpha} - \frac{1}{P}\right)} \quad (1)$$

In order to obtain a circular cross section of the beam impinging on the test plane 12, it is a feature of the invention that the edges of all field lenses of array 13 are elliptically formed. This is shown in FIG. 4 in which arrows a and b, drawn only for field lens 13b by way of example, indicate the different lengths of the two axes of the elliptical field lenses. In this embodiment, the longer axis (a) lies in the plane formed by the beam impinging on and reflected by the mirror 6.

According to another feature of the invention, each of the projection lenses 14 has the same outer periphery as the field lens 13 directly adjacent thereto.

In the preferred embodiment shown, the following values are chosen for the angle of incidence α of the beam impinging on the collimator mirror, the radius of curvature r of the mirror, the target distance T and the projection distance P:

α = 29°
r = 30 m
P = 17 m
T = 14.667 m

Applying the formula (1), a distortion error of 7.5% results. To compensate for this distortion error, the axes ratio (a:b) of the elliptical edges of the field lenses of array 13 is chosen to be 1.075 and the beam impinging on the test plane 12 has a circular cross section.

It is understood that the foregoing description is that of the preferred embodiments of the invention and that various changes and modifications may be made thereto without departing from the spirit and scope of the invention as defined in the appended claims.

What is claimed is:

1. A sun simulator for simulating conditions in outer space comprising:
   a housing defining a test chamber; and,
   an optical arrangement for transmitting high-intensity radiation into a circular test plane of predetermined dimensions located in said test chamber, the optical arrangement including:
   radiation source means for supplying the high-intensity radiation;
   an integrator assembly for transmitting the radiation supplied by said source means along a first beam path with a predetermined cross section;
   a collimator mirror mounted in said housing and being a distance (T) from the test plane and a distance (P) from said integrator assembly and having a curved reflecting surface defining a predetermined radius of curvature (r) for reflecting said radiation along a second beam path onto the test plane in the form of a beam of radiation having a distortion which is dependent upon: the angle of incidence (α) of said radiation on said mirror; said radius of curvature (r); said distance (P); and, said distance (T);
   said first beam path and said second beam path conjointly defining a common plane and said test plane being perpendicular to both said common plane and said second beam path;

said integrator assembly being mounted outside of said housing and including a plurality of field lenses arrayed one next to the other, each of said lenses having an elliptical outer periphery selected to compensate for said distortion so as to impart a cross section to the beam of radiation reflected by said mirror means that conforms substantially to said predetermined dimensions of said circular test plane thereby substantially preventing the occurrence of unwanted radiation outside of the test plane.

2. The optical arrangement of claim 1, wherein each of said lenses has a major axis (a) lying in said common plane and a minor axis (b) perpendicular to the latter.

3. An sun simulator for simulating conditions in outer space comprising:
a housing defining a test chamber; and,
an optical arrangement for transmitting high-intensity radiation into a circular test plane of predetermined dimensions located in said test chamber, the optical arrangement including:
radiation source means for supplying the high-intensity radiation;
an integrator assembly for transmitting the radiation supplied by said source means along a first beam path with a predetermined cross section;
a collimator mirror mounted in said housing and being a distance (T) from the test plane and a distance (P) from said integrator assembly and having a curved reflecting surface defining a predetermined radius of curvature (r) for reflecting said radiation along a second beam path onto the test plane in the form of a beam having a distortion which is dependent upon: the angle of incidence ($\alpha$) of said radiation on said mirror; said radius of curvature (r); said distance (P); and, said distance (T);
said first beam path and said second beam path conjointly defining a common plane and said test plane being perpendicular to both said common plane and said second beam path;
said integrator assembly being mounted outside of said housing and including a plurality of field lenses arrayed one next to the other, each of said lenses having an elliptical outer periphery selected to compensate for said distortion so as to impart a cross section to the beam reflected by said mirror means that conforms substantially to said predetermined dimensions of said test plane thereby substantially preventing the occurrence of unwanted radiation outside of the test plane; and,
each of said lenses having a major axis (a') lying in said common plane and a minor axis (b') perpendicular to the latter and said periphery of each of said field lenses being selected so as to have an axis (a'/b') ratio given by:

$$V = \frac{a'}{b'} = \frac{1 - T\left(\frac{2\cos}{r} - \frac{1}{P}\right)}{1 - T\left(\frac{2}{r\cos} - \frac{1}{P}\right)}$$

4. A sun simulator for simulating conditions in outer space comprising:
a housing defining a test chamber; and,
an optical arrangement for transmitting high-intensity radiation into a quadrilateral test plane of predetermined dimensions located in said test chamber, the optical arrangement including:
radiation source means for supplying the high-intensity radiation;
an integrator assembly for transmitting the radiation supplied by said source means with a predetermined cross section;
a collimator mirror mounted in said housing and being a distance (T) from the test plane and a distance (P) from said integrator assembly and having a curved reflecting surface defining a predetermined radius of curvature (r) for reflecting said radiation onto the test plane in the form of a beam having a distortion which is dependent upon: the angle of incidence ($\alpha$) of said radiation on said mirror; said radius of curvature (r); said distance (P); and, said distance (T);
said first beam path and said second beam path conjointly defining a common plane and said test plane being perpendicular to both said common plane and said second beam path;
said integrator assembly being mounted outside of said housing and including a plurality of field lenses arrayed one next to the other, each of said lenses having an outer periphery selected to compensate for said distortion so as to impart a cross section to the beam reflected by said mirror means that conforms substantially to said predetermined dimensions of said test plane; and,
said outer periphery of each of said field lenses being selected so as to be pincushion-shaped.

5. A sun simulator for simulating conditions in outer space comprising:
a housing defining a test chamber; and,
an optical arrangement for transmitting high-intensity radiation into a test plane of predetermined dimensions located in said test chamber, the optical arrangement comprising:
radiation source means for supplying the high-intensity radiation;
an integrator assembly for transmitting the radiation supplied by said source means along a first beam path with a predetermined cross section;
a collimator mirror mounted in said housing and being a distance (T) from the test plane and a distance (P) from said integrator assembly and having a curved reflecting surface defining a predetermined radius of curvature (r) for reflecting said radiation along a second beam path onto the test plane in the form of a beam having a distortion which is dependent upon: the angle of incidence ($\alpha$) of said radiation on said mirror; said radius of curvature (r); said distance (P); and, said distance (T);
said first beam path and said second beam path conjointly defining a common plane and said test plane being perpendicular to both said common plane and said second beam path;
said integrator assembly being mounted outside of said housing and including a plurality of field lenses arrayed one next to the other, each of said lenses having an outer periphery selected to compensate for said distortion so as to impart a cross section to the beam of radiation reflected by said mirror means that conforms substantially to said predetermined dimensions of said test plane thereby substantially preventing the occurrence of unwanted radiation outside of the test plane; and, said integrator assembly further including a plurality of projection lenses arrayed one next to the other, said projection lenses being mounted so as to be downstream of and adjacent to respective ones of said field lenses, each of said projection lenses having the same outer periphery as the field lens directly adjacent thereto.

* * * * *

UNITED STATES PATENT AND TRADEMARK OFFICE
CERTIFICATE OF CORRECTION

PATENT NO. : 4,701,023
DATED : October 20, 1987
INVENTOR(S) : Karl-Heinz Hager et al It is certified that error appears in the above-identified patent and that said Letters Patent is hereby corrected as shown below:

In column 5, lines 56 to 63: delete

"$$V = \frac{a'}{b'} = \frac{1 - T\left(\frac{2\cos}{r} - \frac{1}{P}\right)}{1 - T\left(\frac{2}{r\cos} - \frac{1}{P}\right)}$$"

and substitute $$-- V = \frac{a'}{b'} = \frac{1 - T\left(\frac{2\cos\alpha}{r} - \frac{1}{P}\right)}{1 - T\left(\frac{2}{r\cos\alpha} - \frac{1}{P}\right)} \text{ -- therefor.}$$

Signed and Sealed this

Nineteenth Day of April, 1988

Attest:

DONALD J. QUIGG

*Attesting Officer*   *Commissioner of Patents and Trademarks*